Patented Apr. 14, 1931

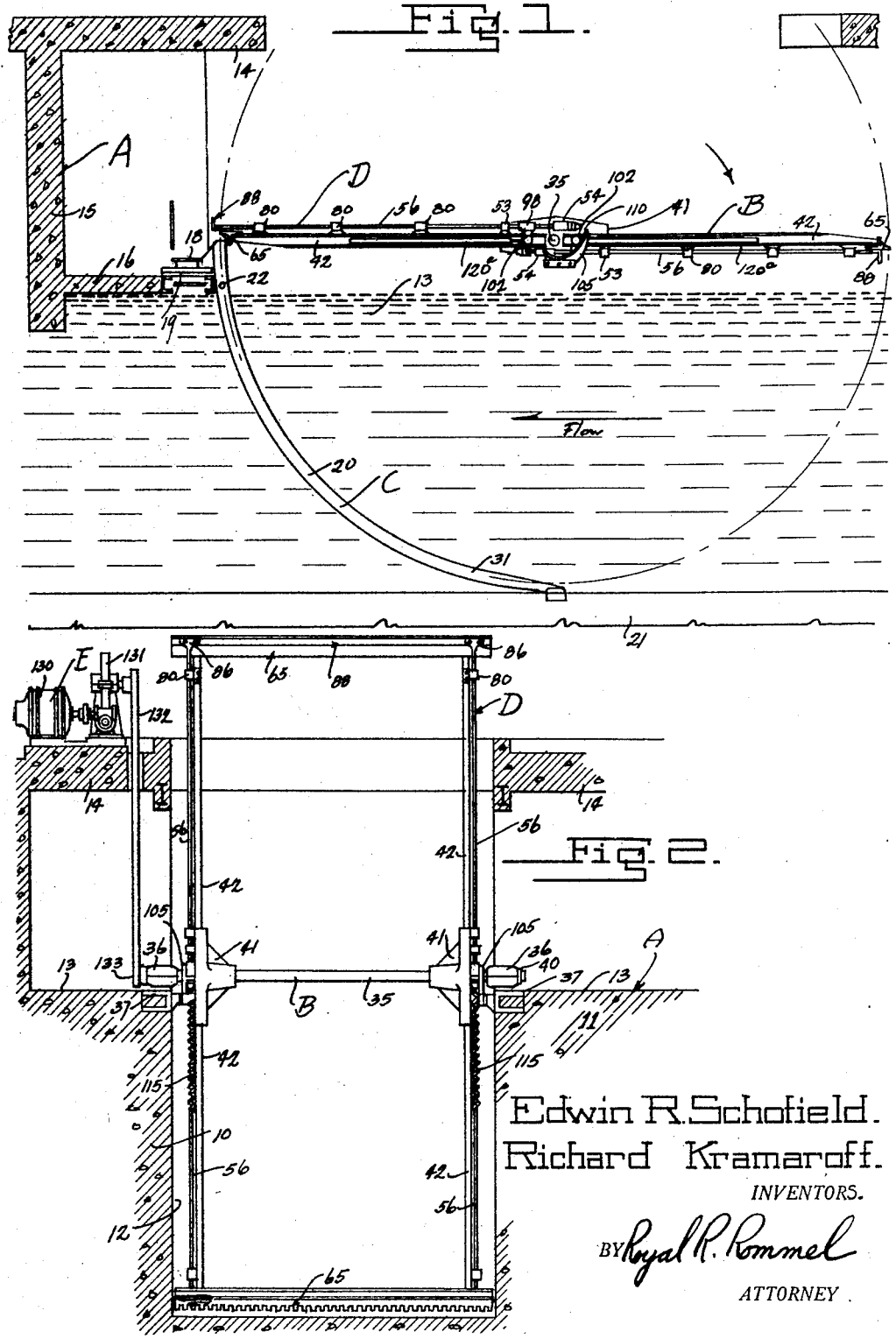

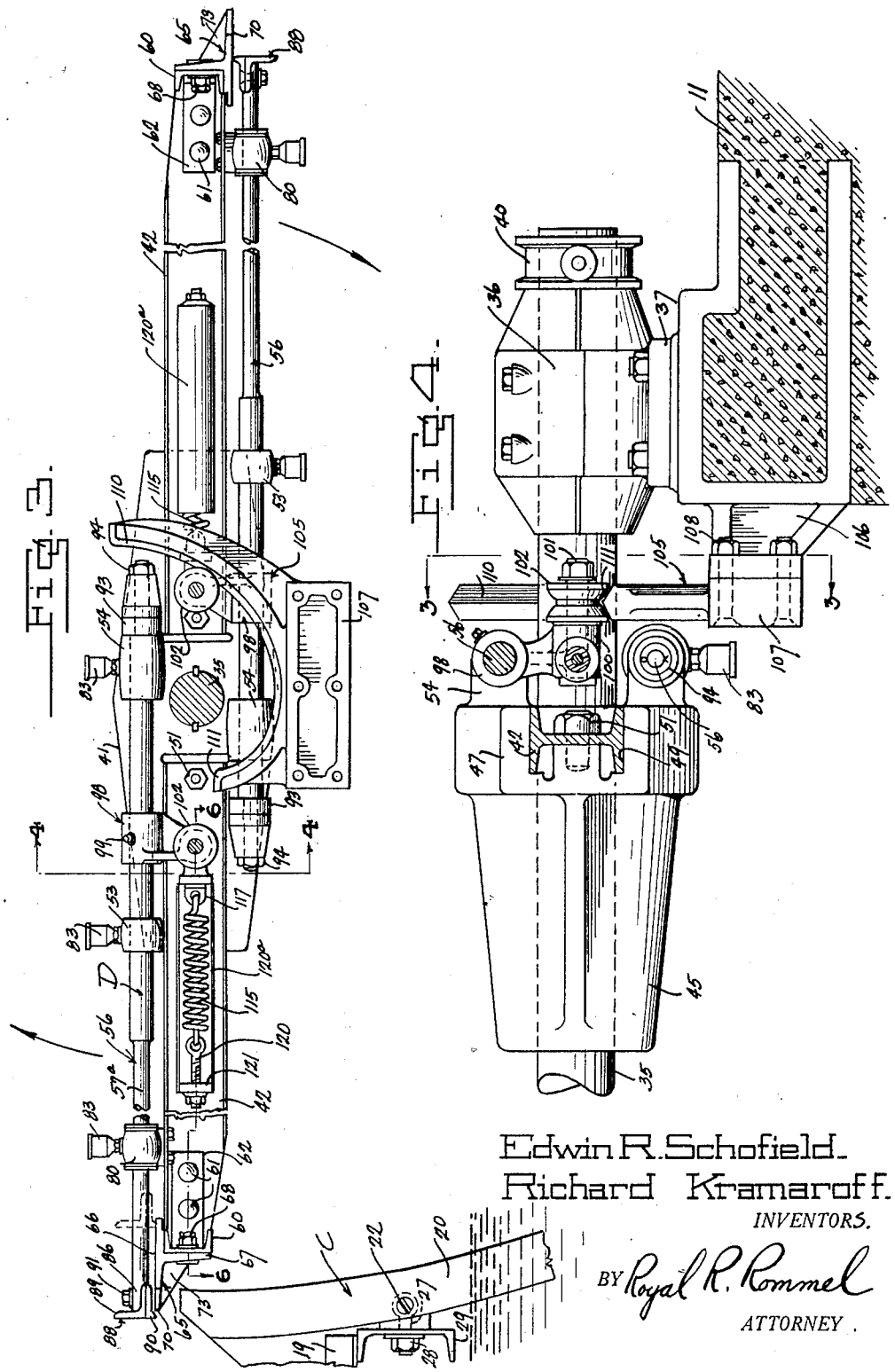

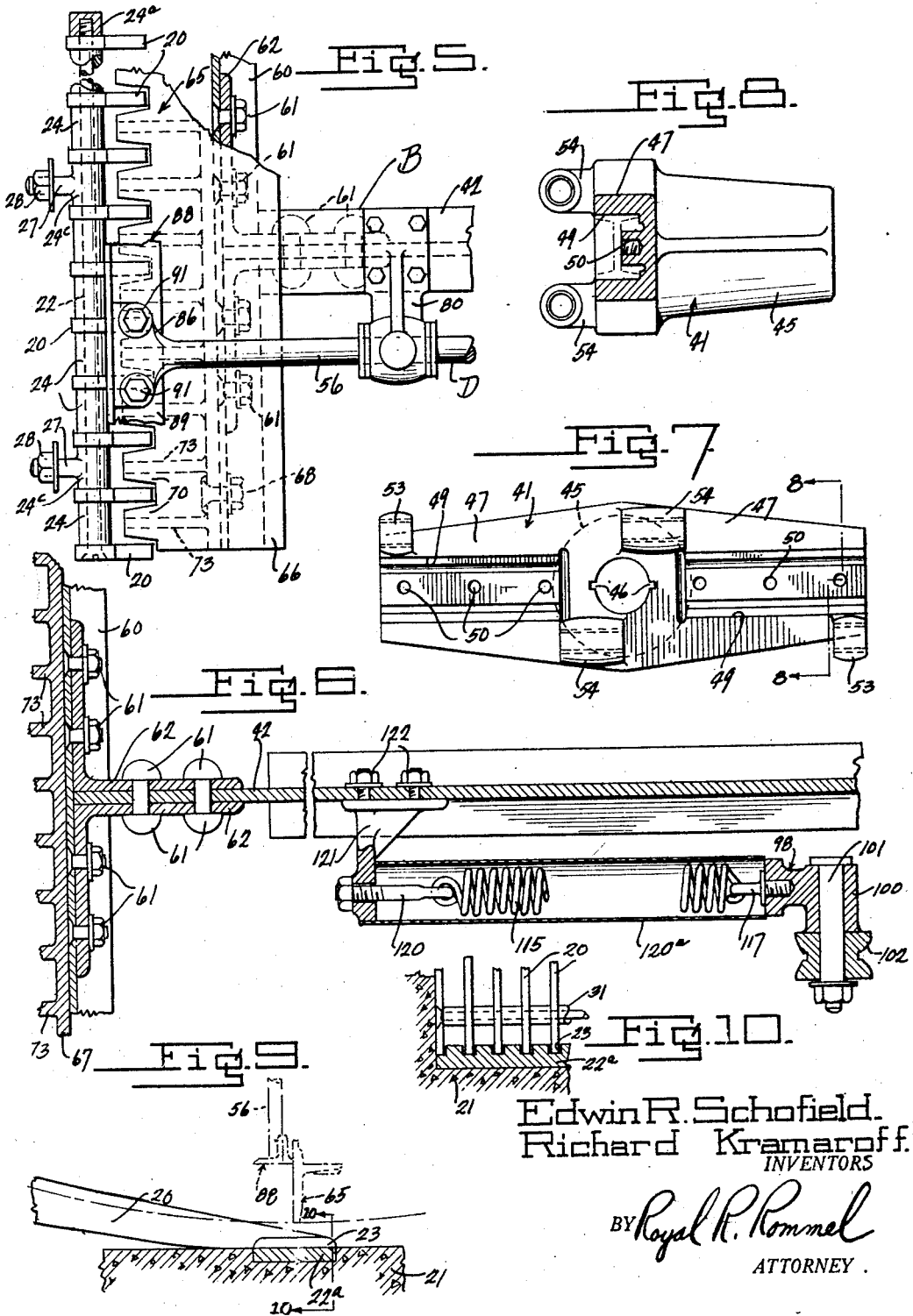

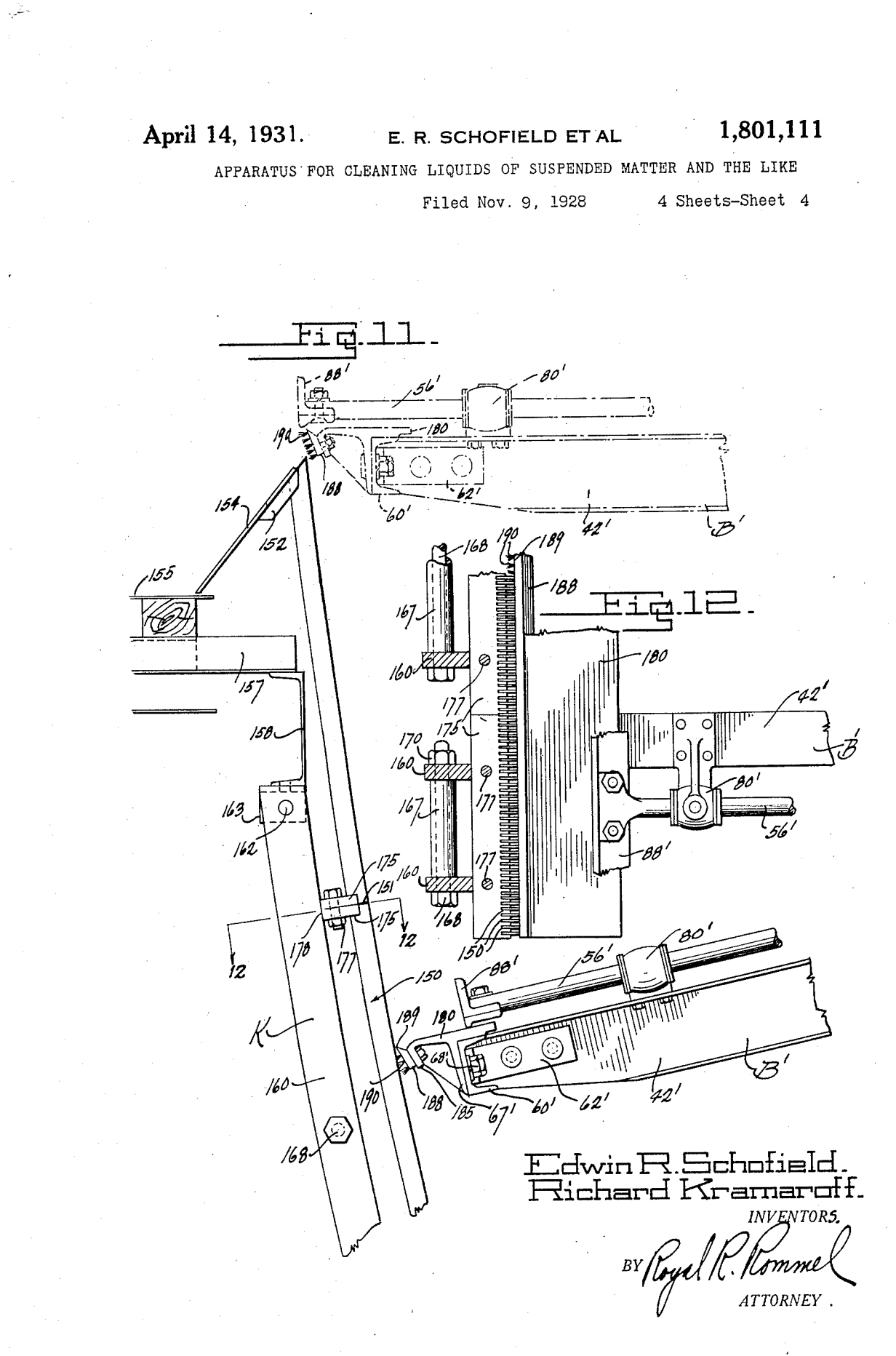

1,801,111

UNITED STATES PATENT OFFICE

EDWIN R. SCHOFIELD AND RICHARD KRAMAROFF, OF PHILADELPHIA, PENNSYLVANIA

APPARATUS FOR CLEANING LIQUIDS OF SUSPENDED MATTER AND THE LIKE

Application filed November 9, 1928. Serial No. 318,227.

This invention relates to improvements in movable rakes adaptable for the cleaning of solids and suspended matter, or detritus from bodies of water or other liquid.

The primary object of this invention is the provision of an improved rake apparatus adapted to cooperate with a screen placed across a body of flowing water so as to scrape from the rake solids and suspended matter caught thereon; the improved rake embodying a novel cleaning mechanism for automatically discharging the scrapings; the improved rake and its cleaning mechanism being more particularly adapted for use in connection with the removal of detritus or screenings from sewage.

A further object of this invention is the provision of an improved rotary rake having an automatic cleaning device thereon.

Other objects and advantages of this invention will be apparent during the course of the following detailed description.

In the accompanying drawings, forming a part of this specification, and wherein similar reference characters designate corresponding parts throughout the several views, Figure 1 is a longitudinal sectional view taken through a channel through which a flowing body of liquid is adapted to pass; the view showing a collecting screen and the improved rake and cleaning mechanism associated therewith.

Figure 2 is a vertical sectional view taken across the channel, showing more particularly the vertically disposed rotary rake and its driving mechanism, with respect to the channel.

Figure 3 is a fragmentary sectional view taken substantially on the line 3—3 of Figure 4, showing the relation of parts at a side of the improved rake, with the cleaning mechanism thereon.

Figure 4 is a fragmentary sectional view taken substantially on the line 4—4 of Figure 3; the said view being made on a larger scale than Figure 3.

Figure 5 is a fragmentary plan view showing one corner of the improved rake, with respect to the screen and rake cleaning details.

Figure 6 is a sectional view taken substantially on the line 6—6 of Figure 3, showing more particularly the spring means for operating the scraper mechanism.

Figure 7 is a side elevation of a side casting of the rotary rake mechanism.

Figure 8 is a sectional view taken substantially on the line 8—8 of Figure 7.

Figure 9 is a fragmentary view, partly in section, taken at the bottom of the screen, and showing in dotted lines the relation of the rake as it enters the same for scraping refuse and detritus therefrom.

Figure 10 is a sectional view taken substantially on the line 10—10 of Figure 9.

Figure 11 is a fragmentary view showing a modified form of screen, in which the bars are very closely spaced in order to screen from the liquid all fine suspended matter; the improved rotary cleaner having a scraper and brush both cooperating over the fine screen to remove accumulated detritus.

Figure 12 is a fragmentary plan view, partly in section, taken substantially on the line 12—12 of Figure 11, and showing details of the modified fine screen and improved brush-scraper.

In the drawings, wherein for the purpose of illustration is shown only a preferred embodiment of the invention, the letter A may generally designate a foundation or other support upon which the improved rotary rake mechanism B may be mounted. The support A provides a channel through which a body of liquid flows; the channel having therein a screen C over which the rotary rake B cooperates for the removal of suspended matter caught thereon. The improved rotary rake B is provided with self cleaning mechanism D as a cooperative compacted part thereof. Means E is provided for rotating the rake B.

The foundation or support A may of course vary to a great extent, depending upon the nature of the suspended matter, which the improved rake is adapted to remove from the liquid. Thus, it is to be understood at the outset, that while the preferred use of the improved rotary rake and its automatic cleaner is in connection with the treatment of sewage, it is not necessarily limited to such use, but may find application wherever it is desirable to thoroughly and economically remove suspended matter from liquid.

In the example shown, the support A may comprise walls 10 and 11 defining a channel or compartment 12 therebetween, thru which the sewage, shown at 13ª in Figure 1 of the drawings, is adapted to longitudinally flow. Suitable runways or rooms 13 may be provided on or in the walls 10 and 11, and if desired a reinforced overhead roof or supporting structure 14 may be provided above the channel.

As shown in Figure 1 of the drawings, a transverse wall 15 may be supported across the upper part of the sewage channel, in a connected relation with the superstructure 14 and the side walls 10 and 11, if desired; the same providing a platform 16, shown in Figure 1, above the maximum water level; the wall 15 and the platform 16 being so positioned that they will not interfere with the normal flow of sewage through the channel. The platform 16 is adapted to support a conveyor 18 in the nature of an endless belt, suitably mounted by any approved means 19, and adapted to receive the collected matter and detritus as it is discharged by the cleaner from the rake apparatus B, in order to convey the same to the desired location where it may be disposed of. This endless conveyor is not necessarily a novel feature of this invention, as it has been heretofore resorted to for removing screenings of this type.

Before detailing the description of the screen C, it should be mentioned that the rake B is mounted for rotation in the channel or compartment 12 on a fixed axis.

Referring to the screen C, the same consists of a plurality of flat segmental bars 20, shown best in Figures 1 and 5 of the drawings; the lower ends thereof being anchored in the floor 21, of the channel, upon a spacing plate 22ª shown in Figures 9 and 10, which is embedded in the cementitious floor or foundation 21. This spacing plate 22ª is provided with spaced recesses 23, in which the lower tapered ends of the screen bars 20 seat to prevent lateral shifting. The bars 20 are preferably 90° in curvature, throughout the length thereof, and the upper ends thereof are held spaced in a relation which is more particularly shown in Figures 5 of the drawings. That is, the bars 20, short of their upper ends, are transversely apertured; and thru which apertures is extended a tie bolt 22, of the required length; spacing sleeves 24 being received on the tie bolt 22 between the bars 20, to hold them spaced. As shown in Figure 5, in dotted lines, the head of the bolt 22 may be countersunk in the outermost screen bar, and at its opposite end it is threaded in a threaded spacer 24ª.

The upper end of the screen assemblage C may be supported against part of the platform structure 16, as shown in Figure 1 of the drawings, and the preferred way of anchoring it is shown in Figures 3 and 5 of the drawings; several of the spacing sleeves 24ᶜ being provided with screw threaded shanks 27 adapted to receive nuts 28 thereon; the shanks 27 being adapted for attachment to a cross channel 29 which may be suitably anchored to the platform 16, or to the supporting structure A, in any approved manner.

It is to be noted that the screen C may have the bars 20 thereof suitably connected by tie bolts or rods and spacing sleeves similar to that shown in Figure 5, at a location designated at 31 in Figure 1 of the drawings, adjacent the lower ends of the bars. It is to be noted that the bars extend above the level of the top of the conveyor 18, so that the refuse may be knocked thereover onto the conveyor by the rotary rake and cleaning mechanism.

The rotary rake structure B includes a shaft 35, supported at its ends on suitable bearings 36 provided therefor on reinforced bases 37 at opposite sides of the channel 12, on the walls 10 and 11; the bases 37 being anchored in said walls as shown in Figures 2 and 4 of the drawings, at the floor of the rooms 13, so that the shaft 35 is supported in the bearings 36 horizontally above the maximum level of liquid adapted to pass through the channel 12. This rotary shaft 35 is provided with a safety collar 40 at one end, and is connected for drive with the means E at the opposite end, in a relation to be subsequently described. Between and adjacent the bearings 36, the shaft 35 is provided with suitable supports or castings 41, which are similar in structure, and each of which are adapted to support diametrically opposed and aligned supporting rails 42. These rails 42, as shown in Figure 2, are in balanced relation, and the two rails or frame beams 42 at each side of the axis of the shaft 35 are adapted to support a complete rake and cleaning mechanism. In fact, it is a feature of the invention, that the rake structure consist of balanced rakes and individual cleaning mechanisms at diametrically opposed sides of the shaft 35, and as they are identical, but one of the complete rakes and complete cleaning mechanisms will be described; it being understood by reference to the drawings, where similar reference characters have been given to like parts, that the rake mechanisms and their cleaners are the same at opposite sides of the shaft 35.

As shown in Figures 7 and 8 of the drawings, the castings 41, which are preferably made of cast steel, are provided with sleeve portions 45, having key ways 46 therein, with which the shaft 35 is keyed. Integral with the sleeves 45 at the outer larger end thereof and at diametrically opposed sides, rail supporting extensions 47 are provided, which are altogether similar, and are provided with longitudinal slots 49, shown in Figures 7 and 8, opening at the outer ends thereof; said slots 49 being adapted to receive therein the adjacent ends of the rails 42, which in fact are I-beams. Screw threaded sockets 50 are provided in these extensions 47, which receive bolts 51, as shown in Figure 4 of the drawings, to clamp the webs of the I-beams or rails 42, in place, upon the castings 41. Each casting 41 is furthermore provided with a bearing extension 53 at the outer side of each of the extensions 47, at the free end thereof; and each bearing extension 53 has a second bearing extension 54 aligned therewith; the bearing extensions 53 and 54 being adapted to slidably support reciprocating push rods 56 of the cleaning means D, in a manner to be subsequently described.

The supporting arms or beams 42, at each side of the axis of the shaft 35, at the outer ends thereof, are provided with a cross channel 60, shown in Figure 3 of the drawings, and also in Figures 5 and 6; this cross channel 60 being bolted and riveted as shown at 61 in Figure 6 of the drawings, by means of inside and outside angle clips 62, to the web at the outer ends of the I-beams 42.

Each channel 60 is adapted to support a rake head, end, or body 65, which is shown in Figure 3, is of substantially a T-shaped formation, including a plate portion 66, and a depending attaching flange 67, which is adapted to overlie the base of the channel 60, and is bolted thereto as at 68, shown in Figure 5 of the drawings. The plate 66 along its outer longitudinal edge is provided with blunt tapered teeth 70, which lie in the plane of the plate 66, and are integral therewith, and are of a width and length suitable for operating freely, but with small clearance, in the spaces between the bars 20 of the screen C, for scraping detritus and refuse or other suspended matter which has collected upon the screen. The relation of the teeth to the bars 20 of the screen is well shown in Figure 5 of the drawings.

The teeth 70 are preferably reinforced by means of web flanges 73, shown more particularly in Figure 3 of the drawings, which connects said teeth with the attaching flange 67.

Before referring to the cleaning devices D for each of the rakes, it should be noted that the shaft 35 defining the axis of rotation of the rakes is concentric with the arc of the screen C, so that the teeth of the rake bodies 65 enter between the bars 20 of the screen as is shown by the dotted lines in Figure 9 of the drawings.

The cleaning devices D are the same for each rake structure at each side of the axis of the shaft 35, and identically positioned with respect thereto, to assist in counterbalancing the weight upon the shaft 35. Each complete cleaning structure D consists of a slide rod 56, reciprocably supported upon their respective castings 41, in the bushings of the aligning extension bearings 53 and 54; the rods 56 at their outer ends being diametrically reduced at 57$^a$ and also slidably supported in detachable extension bearings 80, which as shown in Figures 1 and 3 of the drawings, are detachably supported on the top flanges of the beams 42. If desired, the extension bearings 53, 54 and 80 may be provided with oil or grease cups 83, as shown in Figure 3. In plan, it is to be noted that the reciprocating rods or supports 56 of the scrapers are offset laterally beyond the rails or beams 42 upon which they are respectively supported, for the purpose of being operated by cam means to be subsequently described.

The reciprocating push rods 56, at their free ends, are enlarged, as shown at 86 in Figure 5 of the drawings. For each cleaner D, the push rods 56 at each side of the axis of the shaft 35 are provided at their outer ends with a scraping body 88, which as is shown in Figure 3 of the drawings, is in the nature of upper and lower angles 89 and 90, bolted at 91 to the ends 86 of the said push rods 56. In length, the cleaner bodies 88 are about equal to the width of the channel in which they operate, that is, the channel 12, as is shown in Figure 2 of the drawings, and in this respect they are of the same length as the length of each of the rake bodies 65, as is shown in Figure 2 of the drawings.

For reasons which will be more fully apparent hereinafter, it may be mentioned that the push rods 56 are normally retracted into the position illustrated in the right hand cleaning apparatus of Figure 3 of the drawings, that is, pulled inwardly of the teeth of the adjacent rake body 65, and operate from this position longitudinally of the rake supporting frame, over the teeth to the position shown in the left hand cleaner structure of Figure 3 of the drawings. The reciprocatory action through which the cleaning devices D operate necessitates that some means be provided to buff the action. To this end, rubber cushions or gaskets 93 are provided upon the ends of each of the push rods 56 at the opposite side of the bearings 54 remote from their respective scraper heads 88, which are adapted to receive the shock, as the end assemblage 94, which detachably hold the push rods in place, comes into engagement to compress the buffers 93 against the bearings 54, as shown in Figure 3 of the drawings.

Each push rod 56 is provided with an adjustable bracket 98 thereon, which has a sleeve adjustably receiving the respective push rod 56 therethrough, and is provided with a set screw 99 to clamp the same in place. These brackets 98 depend below the respective push rods 56, and are provided with transverse sleeves 100, shown best in Figure 4 of the drawings, and also in Figure 6 of the drawings; the passageway through which is at right angles to the axis of the push rod 56, and detachably supports therein a pin 101, upon which a cam roller 102 is rotatably mounted. The cam roller 102 is peripherally grooved in a substantially V-shaped relation, and it is adapted to operate upon a stationary cam 105, to be subsequently described.

A cam 105, is provided on a bracket portion 106 of each of the bases 37 to which the shaft bearings are anchored; the cams 105 each being supported in a plane within the upper part of the channel, and having a lower rectangular casting 107 secured by bolts 108, as shown in Figure 4 of the drawings, to the bracket 106. The cam 105 furthermore includes a segmental or arcuated cam track 110, which is non-concentric with the axis of the shaft 35, and the upper end of which is positioned to receive the roller 102 when the scraper head 88 of the cleaning apparatus D is fully extended, and as the rake rotates and the roller 102 operates over the track 110, the roller 102 will cause a retraction of the scraper body 88 radially towards the shaft 35 in order to clear the teeth of the rake body 65. The extended and retracted positions of the scraping bodies 88 are respectively shown in the left and right hand cleaning mechanisms of Figure 3 of the drawings, with the roller 102 of the right hand cleaning mechanism operating on the track 110 to cause a retraction of the scraping head 88. As the rake passes over the top of the screen C, at 111, the rollers 102 roll off the track 110 of the cam, and the scrapers are permitted to move forwardly and scrape the refuse off the rake bodies.

The means provided for forcefully urging the scraping heads 88 of the cleaner devices D over the rake bodies, for discharge of collection therefrom, preferably consists of tension springs 115, best shown in Figures 3 and 6 of the drawings. Each cleaner mechanism D is provided with two of these springs 115, one at the outer side of each of the beams 42. This is a strong spiral spring, and detachably connected by eyebolt 117, as shown in Figure 6 of the drawings, to the sleeve 100 of the adjustable push rod bracket 98. The springs 115 at their opposite ends are connected to adjustable bolts 120; each adjustable bolt 120 being connected to a suitable bracket 121 connected at 122 to the web of the respective rails or beams 42, as shown in Figure 6. Of course, the springs 115 are under tension, and act to throw the push rods 56 forwardly and the scraping heads 88 to the position shown in the left hand part of Figure 3 of the drawings, where they perform the function of scraping the collection from the rake body onto the conveyor belt. It is at once obvious, that with the rake rotating in the direction of the arrows shown in Figure 3 of the drawings, that is, clock-wise, as the rollers 102 ride upon the cam trackways 110, the springs will be gradually further tensioned as the push rods 56 are retracted together with the scraping head 88. Of course, the trackway 110 is on an arc eccentric with the axis of the shaft 35 and from the upper end of the cam the trackway 110 gradually approaches the shaft 35.

If desired, flexible coverings 120 may be provided for the springs 115.

Referring to the means E which operates the screen at a substantially uniform speed of rotation, the same preferably comprises a motor 130, connected by reduction gearing 131 with an endless chain 132 which is trained over a sprocket wheel 133 keyed on the end of the shaft 35. Obviously, this will rotate the shaft 35 and the two rakes and two cleaning mechanisms therewith. The motor and reduction gearing may be on the superstructure if desired.

The operation of the rake and the cleaning mechanisms will be apparent from the foregoing. The diametrically opposed rakes operate alternately, over 90° of the concentric screen C, and striking the screenings, picks them up and pushes them along the screen until the rakes and their frames reach a horizontal position, just above the tops of the screen bars, and at which point the cams release the reciprocating cleaners, and the scraper heads are forcefully pushed by the springs 115 against the collected matter on the rake bodies to force the refuse onto the conveyor 18.

Referring to the modified form of invention illustrated in Figures 11 and 12, the fine screen structure K preferably consists of closely spaced fine flat segmental bars 150, the lower ends of which may be anchored similar to that described for the preferred form of screen C. For ease of manufacture and to facilitate replacement, each of the fine screen bars 150 is longitudinally divided into a plurality of sections, as shown at location 151, and elsewhere therealong (not shown), if desired. The upper ends of the screen bars 150 are preferably secured in closely spaced relation by means of flanges 152, to which the upper ends of said bars are welded; the flanges 152 being secured upon a sloping table 154 which carries the detritus, after it is discharged by the rotary scraper, onto the endless conveyor 155.

A horizontal beam 157 is secured in any approved manner to the foundation structure, and rests upon a channel 158 which is suitably secured to the foundation structure at the opposite side of the screen bars 150 with respect to the rotary scraper.

Inasmuch as the fine screen bars 150 are light in weight, and cannot for this reason be made sufficiently strong, we prefer to reinforce said fine screen bars by means of a framework consisting of heavy bar sections 160, of segmental formation, which are placed in substantial parallelism rearwardly of the fine screen; said heavy reinforcing bar sections 160 being riveted or otherwise secured at 162, at their upper ends, to angle clips 163, which are secured as by riveting to the lower leg of the channel 158, as shown in Figure 11 of the drawings. These screen bar reinforcing sections 160 are placed at predetermined spaced intervals rearwardly of the fine bar screen and held in properly spaced relation by means of spacing sleeves 167, shown in Figure 12 of the drawings, through which bolts 168 are threaded; said bolts having nuts 170 clamping the spacing sleeves 167 between the adjacent reinforcing bars 160.

Longitudinally extending separators 175 are provided, the forward margins of which are toothed with sockets into which the lower and upper ends of adjacent screen bar sections are placed, to hold said screen bar sections in spaced relation; the separators 175 being placed in abutment and bolted at 177, and also preferably welded at 178 to the reinforcing bars 160; although the said separator bars 175 may merely rest at their rear edges against the forward edges of the bars 160 if found sufficient.

The fine screen structure K is supported, otherwise than above described, in the same manner as set forth for the preferred or coarser screen structure.

The rotary cleaner or rake B' is substantially the same in construction as the rake structure B above described, and except as hereinafter qualified, it is to be understood that the rotary cleaner B' is of the same nature and structure as said rake B.

The rotary cleaner B', of course, includes the beams 42' which at similar outer ends are provided with a transverse channel 60', bolted as by angle clips 62' in the same relation above described for the cleaner B. However, a detritus collecting table 180 is provided, shaped substantially the same as the rake body 65 for the preferred form of invention, and which is provided with a transverse attaching flange 67' bolted in place to the channel 60', at 68'. This table 180 provides a flat top surface on which the detritus collects, and over which the scraping body 88' cooperates in the same manner as above described for the preferred form of invention, to discharge detritus upon the sloping platform 154 and the conveyor 155. Of course, the scraping body 88' is secured transversely at the outer ends of the reciprocating rod 56', which bear in suitable brackets 80' attached on the beams 42', as shown.

As a novel structural feature of this invention, necessitated by reason of the fine spacing of the screen bars 150, we prefer to provide an attaching flange 185, disposed at an acute angle to the detritus collecting table 180, and extending to the same side thereof as the attaching flange 67', and which attaching flange 185 detachably receives a longitudinally extending scraper-brush body or blade 188, provided with an upper scraping chisel edge 189, in position, as shown in Figure 11, to scrape along the forward edges of the fine screen bars 150, to clean the same of deposits and accumulated detritus. This body 188 is also provided with forwardly extending bristle tufts 190, which also operate over the forward edges and the spaces between the fine screen bars 150, to thoroughly scrape and cleanse the same of even the finest foreign particles which adhere to said screens.

The operation of the invention will be apparent from the above description and the illustrations in Figures 11 and 12. As shown in full lines, the rotary cleaner scrapes and brushes the accumulated detritus from the fine screen bars, moving the same upwardly until the cleaning table has cleared the top ends of the fine screen bars, and at which time, in accordance with the above described operation of the rotary cleaner, the discharge apparatus functions to push the accumulated detritus from the collecting table 180 onto the sloping table 154.

It is within our contemplation to use perforated or slotted plates in lieu of screen bars, and also to operate a rubber or squeegee scraping head over the screen. However, it is deemed most practical by us, where a fine screening of foreign particles from the liquid is desired, to use very closely spaced fine longitudinal screen bars, over which both a blade and brush scraper operates. Such an apparatus may be used for screening suspended matter from sewage or any other liquid.

It is apparent from the foregoing that a very compacted and efficiently operating sewage cleaning mechanism has been provided, which operates on an arc screen in a counterbalanced relation to automatically discharge the sewage collections proportionate to the speed of rotation of the collectors.

Various changes in the shape, size, and arrangement of parts may be made to the form of invention herein shown and described, without departing from the spirit of the invention or the scope of the claims.

We claim:

1. In a self cleaning rake, the combination of a support, a traveling rake on the support complete in itself for a raking action, and a scraper bodily carried by the rake and movable over the rake for removing collected deposits therefrom at a predetermined location during rotation.

2. In a self cleaning rake structure the combination of a support, a rotary rake on the support having a detritus collecting portion, detritus ejecting means movably carried bodily upon the rotary rake for operation over said collecting portion to remove collected deposits from the rake, and means for operating said last mentioned means as the rake rotates for removing collected deposits from the rake at a predetermined location during rotation.

3. In a self cleaning rake structure the combination with a screen adapted to collect deposits thereon from a body of liquid, a rotary rake having raking means mounted for cleaning action over said screen, and cleaning means bodily carried by the rotary rake independent of the raking action of said raking means for removing collected deposits thereon at a predetermined location during rotation.

4. In a rake structure of the class described the combination with an arcuated screen positioned for collection of deposits from a flowing body of liquid, a rake structure including a raking head, means rotatably mounting the rake for operation of the raking head in a deposit collecting relation over said screen, means movably carried for rotation with the rake for discharge movement against collected deposits upon the raking head, and means for operating said last mentioned means as the rake rotates for removing the deposits from the raking head at a predetermined location during rotation after the rake has passed the screen.

5. In a rake structure for removing detritus and the like from liquids, the combination of a rotary rake complete in itself for collecting detritus, and a reciprocating cleaner carried by the rotary rake for rotation therewith including a head for contact with the collected detritus to eject it from the rake.

6. In a rake structure of the class described the combination of a support, a rake rotatably mounted on the support having means to collect rakings thereon, a scraper for the rake reciprocable thereon and bodily rotatable with the rake, and cam means for operating the scraper on the rake at a predetermined location during rotation of the rake into position against the collections for discharging collections from the rake.

7. In combination with a screen for collecting suspended matter from a flowing body of liquid, a conveyor, a screen, a rake movably operating over the screen and including means for collecting the deposits therefrom, cleaning means wholly carried by the rake for movement therewith and operable for discharging the matter from the rake upon the conveyor, and means to cause the cleaning means to so operate at a location where the rake has cleared the screen.

8. In a rotary rake structure the combination of a shaft, bearings for rotatably mounting the shaft, balanced rake mechanisms at diametrically opposed sides of the shaft, and cleaners movably carried by said rakes for operation thereover to shove collected matter therefrom.

9. In a rotary rake structure the combination of a shaft, bearings for rotatably mounting the shaft, balanced rake mechanisms at diametrically opposed sides of the shaft, cleaners movably carried by said rakes for operation thereover to shove collected matter therefrom, spring means actuating said cleaning mechanisms to the latter position, and cam means for retracting the cleaning mechanism against action of their springs during effective operation of the rakes.

10. In a rake structure of the class described the combination of a shaft, means to turn the shaft bearings for the shaft, spaced substantially parallel arms radially carried by the shaft, a rake connected at the outer ends of said arms, push rods reciprocably carried by said arms, and a cleaning head carried at the outer end of said push rods for cleaning movement over the rake body.

11. In a rake structure of the class described the combination of a shaft, means to turn the shaft bearings for the shaft, spaced substantially parallel arms radially carried by the shaft, a rake connected at the outer ends of said arms, push rods reciprocably carried by said arms, a cleaning head carried at the outer ends of said push rods for cleaning movement over the rake body, and means for automatically operating the scraper in a reciprocating action over the rake during rotation of said shaft.

12. In a rake structure of the class described the combination of a shaft, means to turn the shaft bearings for the shaft, spaced substantially parallel arms radially carried by the shaft, a rake connected at the outer ends of said arms, push rods reciprocably carried by said arms, a cleaning head carried at the outer ends of said push rods for cleaning movement over the rake body, means for automatically operating the scraper in a reciprocating action over the rake during rotation of said shaft, said last mentioned means comprising a spring urging the push rods towards the rake, and cam means adapted to retract the push rods against the spring action during a predetermined degree of rotation of said rake.

13. In a rotary collecting and cleaning structure the combination of a shaft, balanced frames carried in diametrically opposed radial relation at opposite sides of the shaft, rake heads at the outer ends of said frames, and independently operable cleaners for the rake heads movably carried by said frames.

14. In a rotary collecting and cleaning structure the combination of a shaft, balanced frames carried in diametrically opposed radial relation at opposite sides of the shaft, rake heads at the outer ends of said frames, independently operable cleaners for the rake heads movably carried by said frames, and means for automatically operating the cleaners at a predetermined location in the rotary movement of said rake heads.

15. In a rotary collecting and cleaning structure the combination of a shaft, balanced frames carried in diametrically opposed radial relation at opposite sides of the shaft, rake heads at the outer ends of said frames, independently operable cleaners for the rake heads movably carried by said frames, means for automatically operating the cleaners at a predetermined location in the rotary movement of said rake heads, said last mentioned means comprising a cam, means on each cleaning mechanism for operation on the cam to cause a retraction of the cleaning mechanism, and spring means acting on the cleaning mechanism for urging the latter in a cleaning operation over the rake head upon release of the cleaning mechanism by said cam.

16. In a device for cleaning detritus from liquids, the combination of a support, a rotary detritus collector carried by the support including a detritus collector portion, and cleaning means rotatable with the collector and operable over the collector portion for shoving detritus from said collector.

17. In a device for cleaning detritus from liquid bodies, the combination of a support, a rotary detritus collector carried by the support, a movable cleaner rotatable with the collector, and means for operating the cleaner relatively over the collector at predetermined locations during its rotation to discharge detritus from said collector.

18. In apparatus for cleaning foreign matter from liquids, the combination of a screen consisting of parallel relatively spaced bars through which the liquid flows to catch the foreign materials therefrom, a rake movably supported adjacent the screen including a raking head stationary thereon having spaced teeth adapted to operate within the spaces between the bars of said screen, cleaning means bodily carried by and movable with the rake, and means to cause the cleaning means to operate over said teeth at predetermined positioning of said rake for discharging collected foreign materials from said teeth and raking head.

19. In a device of the class described a rake structure including a body and a raking head, means movably mounting the rake structure for rotation about a fixed axis, cleaning mechanism movably carried wholly by the body of the rake structure for movement with the rake structure, and means for operating the cleaning mechanism upon the rake structure in a predetermined relation for ejecting collected deposits from the raking head.

20. In a rake, the combination of a rake frame including a raking part, means mounting the rake frame for a raking operating movement, a cleaner bodily mounted upon said rake frame and bodily movable therewith during the operating movement and including a movable detritus removing part, and means for operatively moving the said movable part of the cleaner relative to the raking part in predetermined relation for positive forcing of detritus therefrom.

21. In a rake the combination of a rake frame including a raking part, means mounting the rake frame for an arcuate operating raking movement, a cleaner bodily mounted directly upon said rake frame and bodily movable therewith during its arcuate movement, said cleaner including a movable detritus removal part, and means for operating said detritus removable part relative to the raking part in predetermined detritus ejecting relation therewith.

22. In a self cleaning rake the combination of a support, a traveling rake on the support, a scraper bodily carried by the rake and movable over the rake for positive forcing of detritus therefrom, and means for operating said scraper in a predetermined relation with the movement of said rake for ejecting deposits therefrom.

23. In a self cleaning rake the combination of a support, a rotary rake on the support including means for collecting detritus, and a scraper bodily carried by the rake and movable therover for forcing collected deposits from the means on the rake upon which said deposits are collected, and means for operatively moving said scraper in predetermined position during rotation of the rake for positive ejection of collections from the rake.

24. In a rake and cleaning structure the combination of a traveling rake including a collecting head for receiving detritus thereon during travel of the rake, and an ejector, including a scraper head bodily mounted upon the rake for travel with the rake and operable across the collecting head to remove detritus therefrom.

25. In a self cleaning rake structure, the combination of a support, a traveling rake on the support, and a scraping structure bodily carried by the rake for movement thereover for removal of collected deposits therefrom, said scraper including a roller, and a stationary cam positioned in the path of movement of the roller so that the latter will ride thereover during travel of the rake for operating said scraper for an ejecting operation.

26. In a self cleaning rake structure, the combination of a support, a rotary rake on the support including a part for performing a raking operation, a scraper device reciprocably carried bodily upon the rake and movable over the rake for ejecting deposits therefrom, a stationary cam, and a part on the scraper adapted to engage said stationary cam during rotary travel of the rake for moving said scraper to an ejecting position, the cam and said part bearing such a relation to each other than the cam will release said part at the end of a raking operation for ejecting collections from the rake, said scraper including spring means for moving it to an ejecting position upon release of said part by said cam.

EDWIN R. SCHOFIELD.
RICHARD KRAMAROFF.